United States Patent [19]
Suzuki et al.

[11] 3,869,366
[45] Mar. 4, 1975

[54] METHOD FOR ELECTROCOATING

[75] Inventors: Tameyuki Suzuki, Zushi; Junichi Yasukawa, Chigasaki; Teruhiko Ishii, Chiba; Giiichi Minami, Kobe; Yukihiro Manabe, Amagasaki; Mitsuo Nishimura, Nishinomiya, all of Japan

[73] Assignee: Shinto Paint Co., Ltd., Amagasaki, Japan

[22] Filed: Sept. 29, 1972

[21] Appl. No.: 293,545

[30] Foreign Application Priority Data
Oct. 6, 1971  Japan.............................. 46-79076

[52] U.S. Cl. .............................................. 204/181
[51] Int. Cl. ........................ B01k 5/02, C23b 13/00
[58] Field of Search .................................... 204/181

[56] References Cited
UNITED STATES PATENTS
3,476,668  11/1969  Scheiber et al. ..................... 204/181
3,679,615   7/1972  Gilchrist ............................. 204/181

Primary Examiner—Howard S. Williams
Attorney, Agent, or Firm—Armstrong, Nikaido & Wegner

[57] ABSTRACT

A method of electrocoating is provided which comprises immersing an electrically conductive metallic article as a cathode in an aqueous electrodeposition bath containing a cationic binder resin and a non-ionic synthetic resin powder dispersed therein, the amount of the latter being 100 – 5000 parts by weight per 100 parts of the former, applying a voltage between said cathodic article and an anode to cause electric current flow through said bath so that a resinous coating comprising said binder resin and non-ionic resin powder is electrodeposited on the cathodic article, taking the coated article out of the bath and baking the same to form an adherent resinous film on said article.

13 Claims, No Drawings

METHOD FOR ELECTROCOATING

This invention relates to a method for coating an electrically conductive article. More particularly this invention relates to a method for coating an electrically conductive article by electrodeposition wherein the article to be coated is used as a cathode and is coated by electrodeposition in an aqueous bath containing a basic resin at least partially neutralized with an acid compound and a synthetic resin in the form of fine powder. This invention also relates to a coating composition for use in such electrodeposition coating.

It is known to apply a resin coating on an electrically conductive article by the co-called electrodeposition or electrocoating. In such electrodeposition or electrocoating it has been conventional to employ an anionic type resin which shows behavior as anions in an aqueous bath and is deposited on the anode by passing a current through the bath, or cationic type resin which shows behavior as cations in an aqueous bath and therefore is deposited on the cathode upon passage of an electric current through the bath.

However in the above mentioned conventional electrocoating methods, it requires a relatively long time such as 2 – 5 minutes in forming a coated film of a thickness of 15 – 30 microns and therefore there are required unduly large scale of equipment and unduly large amount of bath in conducting the coating in a continuous conveyor type system. In a batch type coating system the number of articles to be coated per unit time is small. Further in these conventional methods, the maximum film thickness to be obtained is generally up to about 40 microns and therefore the concealability of blemishes on the article to be coated is insufficient. Thus in case of an article requiring a large coating film thickness, a further coating or painting step is required after the above electrodeposition.

In the conventional electrocoating methods it has been most typical to employ an anionic type resin, which is electrodeposited on the surface of an article used as the anode. Therefore, during the electrocoating process, the surface portion of the anodic article will be partly dissolved out by the electrochemical reaction and the so dissolved-out ions will be mixed into the deposited resin film, with the result that the coating will be undesirably stained or discolored. Therefore it is difficult to effect a one-coat finish in white or light color by such anionic electrodeposition coating process. Further such metal ions will tend to react with the anionic binder resin in the deposited film to form a large amount of metal salts, with the result that the thermomeltability of the deposited resin film at the time of the subsequent baking is impaired so that the smoothness of the coating due to the flow of the surface is not obtained to a satisfactory extent. This tendency is more remarkable when the amount of the anionic binder resin in the bath is small while the amount of non-ionic resin powder, pigment, etc. dispersed in the bath is large. Further the reaction of the binder resin with active oxygen generated at the anode will also impair the meltability of the binder resin so that the above explained tendency is promoted.

It has been proposed in such anionic electrodeposition coating process to employ a non-ionic resin powder in addition to an anionic binder resin (e.g. British Pat. Nos. 1,164,153 and 1,164,154). Thus an electrically conductive article is used as the anode, which is immersed into an aqueous bath containing an anionic binder resin, pigment and a non-ionic resin in the form of powder dispersed therein. Upon passage of electric current through the bath there is formed on the surface of the anodic article an electrodeposited coating comprising a mixture of the anionic binder resin, non-ionic resin powder and pigment. When the coating is baked these resins are mixed and fused (and cured) to form an adherent film. However, in such case, the amount of the non-ionic resin powder must be small i.e. up to 70 parts by weight per 100 parts of the binder resin, because if a larger amount of the non-ionic resin powder is used the properties of the resulting coated film is impaired for the reasons explained herein before. Thus the non-ionic resin used there is merely of a nature of minor additive or assistant agent and is not a main component of the resin constituting the coating film. Therefore the favorable properties of the non-ionic resin can not fully be imparted to the coating film.

Therefore it is an object of this invention to provide an improved method for conducting the electrodeposition coating of a resinous material on an article.

Another object of this invention is to provide an improved method for conducting the electrodeposition coating of a resinous material on an article, wherein the article to be coated is used as the cathode and there is used an aqueous bath containing a cationic binder resin and a relatively large amount of non-ionic resin powder.

Another object of this invention is to provide an improved method for conducting the electrodeposition coating of a resinous material on an article, wherein the Coulomb efficiency is high, the amount of resin coating per unit time of electrodeposition is large and the properties of the resulting coating film are excellent.

Other objects of this invention will be apparent from the following description.

Briefly this invention provides a method for coating an electrically conductive article with a resinous material by electrodeposition which comprising immersing said article as the cathode in an aqueous bath containing, as essential components, (1) a water thinnable cationic binder resin which is a nitrogen atom-containing resin neutralized at least partially with an acid compound and (2) at least one non-ionic resin in the form of powder which is solid at the room temperature but can melt when heated to form a film, and applying a voltage between said cathode and an anticorrosive electrical conductor as an anode through said bath, so that said cationic binder resin and non-ionic resin powder are deposited on the surface of the article, the amount of the non-ionic resin being 100 – 5000 parts by weight per 100 parts of the binder resin.

One of the important features of this invention is to employ a water thinnable cationic resin as a binder resin. The second important feature is in that the electrodeposition is not in an anionic type but is in cationic type wherein an article to be coated is used as the cathode so that the resinous material is deposited as a layer or coating on the surface of said article. The third and most important feature of the invention is that an extremely large amount of non-ionic resin in the form of powder is and may be used as a resinous material together with the binder resin in the aqueous electrodeposition bath.

When a cationic electrodeposition system with a cationic binder resin is used the dissolving-out of the cathodic article is nearly negligible and hydrogen gas which is the main component of the gas generated at the cathode does not adversely affect the electrodeposition and does not impair the thermal meltability of the coating resin on the article. Therefore, a remarkably large amount of non-ionic resin in the form of powder may be dispersed in the electrodeposition bath containing the cationic binder resin without causing any difficulty encountered in the anionic electrodeposition pointed out hereinbefore. By combining the above enumerated three important features there are obtained following advantages:

1. The Coulomb efficiency is higher, e.g. 30 to 150 mg./c. Therefore, the amount of consumption of electricity per unit amount of resin deposition is small.

2. The amount of resin deposition per unit electrodeposition time is large so that a coating film with sufficient thickness can be obtained in the order of seconds rather than minutes. Therefore, the production efficiency can be remarkably increased. Further, the electrodeposition can be conducted in an extremely short time and it is possible to adopt a continuous conveyer type painting system with a short length of the electrodeposition tank in the conveyer direction. Further, the amount of the bath liquid to be always prepared may be reduced.

3. Film thickness up to about 130 microns can be obtained, although a range of 60 to 100 microns will be preferable. Since the film thickness is considerably larger than in a conventional method, the blemish concealability of the base of the article to be coated is high, and the feel, luster and properties of the coating film are excellent.

4. Coating film properties as excellent as of a coating film obtained by a conventional powder painting method will be able to be obtained with the electrodeposited coating film of this invention.

In carrying out the invention any electrically conductive metallic article may be used for being coated. Articles made of ferrous materials are preferable. As explained hereinbefore the article to be coated is used as a cathode to be immersed in an electrodeposition bath.

As for the anode any suitable electroconductive and anticorrosive electrodes such as stainless steel or carbon electrodes which are well known in the art may be used.

The cathode and anode are immersed in an aqueous bath in a manner well known in the art of electrodeposition.

As explained before one of the important features of this invention is in the particular composition of the bath.

One essential component of the aqueous bath for the electrodeposition according to this invention is a cationic binder resin. Such cationic binder resins are known per se and may be prepared by at least partially neutralizing a basic resin having nitrogens in the molecule with an acid compound (including a compound which can produce an acid compound when reacted with the basic resin). The cationic resin is water-soluble or water-thinnable.

Examples of the basic resins containing nitrogen atoms in the molecule are amino group-added epoxy resins (aminoepoxy resins), amino group-containing acrylates (aminoacryl resins), amino group-containing vinyl compound copolymers (aminovinyl resins) and polyamide resins.

The aminoepoxy resins may be obtained by adding any organic amino compound to an epoxy group in an epoxy resin or epoxy modified resin. A glycidyl ether of phenol or a glycidyl ether of a phenol-aldehyde condensate is suitable as such epoxy compound. Among commercial products thereof are Epikote 828, Epikote 1001, Epikote 1002, Epikote 1004, Epikote 1007 and Epikote 1009 (trade marks) produced by Shell Oil Co., Araldite 6071, Araldite 6084, Araldite 6097, Araldite 6099 and Araldite 7072 (trade marks) produced by Ciba Ltd. and Epichlon 800, Epichlon 1000 and Epichlon 1010 (trade marks) produced by Dainippon Ink Co. Polyalkadiene epoxide such as polybutadiene epoxide can also be used. Further, a copolymer of unsaturated compound containing an epoxy group such as glycidyl methacrylate, glycidyl acrylate, N-glycidylacrylamide, allylglycidylether or N-glycidylmethacrylamide with another unsaturated monomer copolymerizable therewith is also useful. As an organic amino compound to be added to such epoxy group, a secondary monoamine is most preferable. However, a primary monoamine or polyvalent amine can also be used together with such secondary monoamine. Example of these amino compounds are diethylamine, diethanolamine, diisopropylamine, dibutylamine, diamylamine, diisopropanolamine, ethylaminoethanol, ethylaminoisopropanol, n-butylamine, ethanolamine, ethylenediamine and diethylenetriamine.

The aminoacryl resins or aminovinyl resins are basic resins obtained by copolymerizing an acrylate or methacrylate having an amino group or a nitrogen-containing acrylic or vinyl compound such as vinyl pyridine or vinylimidazole with a vinyl compound having no free acid group. Example of such acrylic acid esters having amino groups are esters of acrylic acids or methacrylic acids and amino alcohols, such as aminoethyl acrylate, aminobutyl acrylate, methylaminoethyl acrylate, dimethylaminoethyl acrylate, hydroxyethylaminoethyl acrylate, aminoethyl methacrylate and dimethylaminoethyl methacrylate. Examples of vinyl compounds having no free acid group and to be copolymerized with the above amino- or nitrogen-containing compounds are acrylic acid and methacrylic acid derivatives such as methyl acrylate, ethyl acrylate, butyl acrylate, 2-ethylhexyl acrylate, acrylamide, N-methylolacrylamide, N-butoxymethylacrylamide, acrylonitrile, methyl methacrylate, ethyl methacrylate, n-butyl methacrylate, isobutyl methacrylate, 2-hydroxyethyl methacrylate, glycidyl methacrylate and methacrylamide, etc., aromatic vinyl compounds such as styrene, α-methyl styrene, vinyl toluene, etc. and other vinyl compounds such as vinyl acetate, vinyl chloride and vinyl isobutyl ether.

The polyamide resins are condensates of a dibasic acid and a polyvalent amine. Examples of dibasic acids are isophthalic acid, adipic acid and dimer acid, and examples of polyvalent amines are ethylene diamine and diethylene triamine.

Examples of acid compounds to be used for the reaction with the basic resin containing nitrogen atoms are hydrochloric acid, phosphoric acid, formic acid, acetic acid, propionic acid, citric acid, malic acid, tartaric and acrylic acid, but any other inorganic acids and organic acids may also be used.

A water-dilutable or thinnable cationic binder resin may be obtained by adding to the basic resin 0.2 to 3 equivalents, preferably 0.5 to 1.5 equivalents of the acid compound to the amino groups or basic nitrogen atoms in the basic resin and agitating the mixture at the normal or room temperature.

As a compound which can produce an acid substance by reacting with the amino group or basic nitrogen in the basic resin at the time of the neutralization or modification of the basic resin, there may be mentioned epihalohydrin such as epichlorohydrin or epibromohydrin. The amount of this modifier may be 0.5 to 2 equivalents to the amino groups or basic nitrogen atoms in the basic resin. A mixture of the basic resin and modifier are heated to 50° to 100°C. The acid produced in the mixed system at the time of such modification will react with the amino groups in the basic resin to obtain a water-dilutable or thinnable cationic binder resin.

The non-ionic synthetic resins in the form of powder and to be used together with the cationic binder resin are those which are solid at the normal or room temperature and can melt when heated in the subsequent baking operation, and may or may not be compatible with the binder resin in the fused film formed at an elevated temperature. The non-ionic synthetic resin should be used in the form of fine powder with an average particle size of 0.5 to 100 microns. Further, the non-ionic resin may be thermosetting by itself or thermoplastic but, preferably, is curable with a curing agent or catalyst which is known per se in the art.

The non-ionic synthetic resin may be selected from the group consisting of epoxy-resins, polyester resins, acrylic resins, polyurethane resins, polyamide resins, polyolefin resins and cellulose derivative resins.

The epoxy resin is a glycidyl etheride of phenol, a glycidyl etheride of a phenol aldehyde condensate or a phenol glycidyl etheride esterified with 10 to 20 % dimer acid. As for the polyester resin there may be used a blend of a melamine resin with a saturated linear polyester or an oil-free alkyd resin.

The acrylic resin is a polymer or copolymer of an acrylate or methacrylate or its copolymer with any other copolymerizable unsaturated monomer. For example, it is a copolymer of an acrylate and styrene, or a copolymer consisting of a methacrylate and unsaturated carboxylic acid. Such acrylic resin may be mixed with a cross-linking agent or curing catalyst such as an amino resin or epoxy resin.

The polyurethane resin is a copolymer produced by the poly-addition of diisocyanate such as trilenediisocyanate or hexamethylenediisocyanate with polyol such as glycol or polyesterglycol, having more than two urethane groups in the molecule.

The polyamide resin is a copolymer produced by the co-condensation of dicarboxylic acid such as aliphatic dicarboxylic acid having more than 6 carbon atoms with diamine such as aliphatic diamine having more than 6 carbon atoms, or by the polycondensation of ω-amino acid having more than 6 carbon atoms, or by the ring-opening polymerization of lactam having more than 4 carbon atoms. For examples of said polyamide resin are Tohmide (tradename of Fuji Chemicals Co.) derived from dimer acid and diamine, 6.6-nylon, 6.10-nylon, 6-nylon, 9-nylon, 11-nylon, mixed type nylon Zytel 3606 (trade name of DuPont), alcohol soluble nylon Amilan CM-4000, CM-8000 (trade name of Toray Co.) produced by the co-condensation of caprolactam with 6.10-nylon salt, and N-methoxymethyl substituted nylon Toresin F-30, HF-30 (trade name of Teikoku Chemical Ind.).

The polyolefine resin may be exemplified as polyethylene or polypropylene having a molecular weight of less than 100 thousand and a particle size (as chemically grinded) of about 1 micron to about 50 microns.

The cellulose derivate resin may be such as cellulose acetate or cellulose acetatebutyrate and may be used supplementally in order to facilitate the flow of the deposited pilm in the baking step.

The above explained basic resins, cationic binder resins and non-ionic synthetic resins are all when known in the art and mostly commercially available, and therefore no further explanation thereabout will be necessary.

In any case, it will be understood that these resins in the state as used in the electrodeposition bath are in the form of prepolymers or precondensates which are curable by themselves or in the presence of a cross-linking agent or catalyst upon the subsequent heat treatment or baking to form a rigid or tough film.

If desired a mixture of two or more different cationic binder resins, and/or two or more different non-ionic synthetic resins may be employed. In case the cationic binder resin is not compatible with the non-ionic synthetic there is a tendency that there is formed a two-layer film upon the subsequent baking.

The amount of the non-ionic synthetic resin powder to be dispersed in the aqueous bath is 100 – 5000 parts, preferably 100 – 1000 parts by weight per 100 parts of the cationic binder resin in the bath.

If desired the bath may also contain pigment which is used in usual paints. The amount of such pigment may be 0 to 30 parts by weight per 100 parts of the total resin (cationic binder resin and non-ionic resin) in the bath.

The bath may also contain a small amount of a curing agent for the resin(s), flow-adjusting agent and other additives which are usually used in the art of synthetic resin type paints.

Further the bath may also contain a small amount (i.e. 0 – 100 parts by weight per 100 parts of the binder resin) of an organic solvent. The organic solvent is useful to increase the adhesiveness of the binder resin, to improve the appearance of the coating film and to improve the stability of the paint. Preferably the organic solvent is a good solvent for the binder resin but is substantially a non-solvent for the powdery non-ionic resin, such as alcoholic solvent e.g. methanol, ethanol, isopropanol, n-butanol, diacetone alcohol, methoxy ethanol, ethoxy ethanol, isopropoxy ethanol, butoxy ethanol, ethylene glycol or propylene glycol.

The solids content in the aqueous bath (dispersion system) is 5 – 30 %, preferably 10 – 20 % by weight.

The pH of the bath may be 7 or lower, preferably 4 – 7.

In carrying out the electrodeposition the bath is maintained at 20° – 35° C. and a voltage is applied between the cathode (article to be coated) and anode to cause direct current flow through said bath. The voltage to be applied is 20 – 600 V., preferably 50 – 400 V.

The electrodeposition is conducted until a coating film of a desired thickness is deposited on the cathodic article. As explained hereinbefore a thicker (than in conventional electrodeposition process) film can be deposited on the article. Preferably the thickness is 60 – 100 microns, but if desired a thickness up to about 130 microns or more can be attained.

In the aqueous bath each of the non-ionic resin particles and pigment particles if any adsorb the cationic binder resin and therefore when an electric current is passed through the bath these particles together with the cationic resin will migrate toward and will be deposited on the cathodic article. This phenomenon is same as in the conventional anionic electrodeposition process except that the deposition occurs on the cathode rather than anode. The cationic binder resin further serves to fill the voids or spaces between the deposited particles to elevate the electric resistance of the deposited film and also to increase the throwing power of the film. Further the cationic binder resin will serve to improve adhesion between the surface of the cathodic article and the film deposited thereon. Of course the cationic resin will constitute a part of the coated film.

After the electrodeposition the resin-coated article is taken out of the bath and washed with water and then heated or baked for melting and/or curing the resinous layer to form a tough film in a conventional manner. Preferably the coated article is preheated at a temperature of 50° – 100°C. for a few minutes or up to about 5 minutes and then baked at 150° – 250°C. for 15 – 30 minutes.

The ratio of the binder resin to non-ionic resin in the deposited film is somewhat different from that in the aqueous bath because there is a tendency that the non-ionic resin particles (and pigment particles if any) are deposited on the cathode in a higher rate than the cationic binder resin. Therefore the proportion of the cationic binder resin in the bath is gradually increased as the electrodeposition proceeds. Further there is a tendency that the acid compound used for the modification or neutralization of the basic resin is partly freed from the cationic binder resin and therefore such free acid compound will be accumulated in the bath as the electrodeposition proceeds.

Therefore a replenishment composition to be added to the bath continuously or intermittently to maintain the bath composition constant should be such as to correct the above disproportionation. It will be understood from the above that, in such replenishment composition, the water content should be lower than that of the bath, the chemical equivalent ratio of the acid compound to the basic resin is lower than that in the bath and the proportion of the non-ionic resin (and pigment, if any) should be higher than in the bath.

It is not always necessary that the cationic binder resin is preformed before being added to the aqueous bath. Thus the cationic binder resin may be formed in situ in the bath. In this case the basic resin and acid compound are separately added to the aqueous bath so that the modification or neutralization of the basic resin with the acid compound to form the cationic binder resin is effected in the bath.

The paint composition of the present invention may be prepared by mixing and adding a non-ionic powdery resin and, as required, a pigment and additive to a siluted solution of a binder resin in water and/or an organic solvent, in the same manner as in the production of an ordinary paint. Further, it is also possible to prepare a binder resin solution and an aqueous dispersion of a non-ionic resin (and pigment) separately so that they are mixed together just before use.

The invention will be further explained by referring to the following examples wherein all parts are by weight.

EXAMPLE 1

488 parts of Epikote 1001, 105 parts of diethanolamine and 250 parts of isopropyl alcohol were made to react under reflux at 80°C. for 3 hours to obtain a liquid aminoepoxy resin as a cationic binder resin. Separately, 100 parts of epoxy resin powder (Epikote 1004), 3 parts of additive Butvar D510 (leveling agent, trade name of Monsanto Co.), 40 parts of rutile type titanium oxide and 5 parts of dicyandiamide were melted and kneaded together in an extruder in an ordinary manner of producing a powdery paint and the solidified mixture was pulverized by an impact type pulverizer into a powder of a maximum particle diameter of 100 microns and an average particle diameter of 40 microns. Then 6.2 parts of glacial acetic acid and 500 parts of deionized water were added to 143 parts of the above prepared binder resin and the mixture was well agitated in a dissolver. Then 634 parts of the above prepared powder were added thereto and the mixture was mixed and dispersed with a high speed rotary homogenizer for 30 minutes and was then diluted with deionized water until the solid content became 12 %. At this time, a small amount of glacial acetic acid was added and the pH of the liquid was adjusted to 4.4 – 4.5. The thus obtained liquid (30°C.) was transferred to an electrodeposition tank. A steel panel (pretreated with phosphoric acid) to be painted was immerzed in the bath as a cathode, while a stainless steel anode was also immersed therein. The electrodeposition was conducted for 10 seconds in the usual manner while strongly agitating the liquid (30°C.). The distance between the electrodes was 15 cm. and the applied voltage was 200 V. The electrocoated panel was taken out, washed with water, preheated for drying at 90°C. for 5 minutes and was then baked at 190°C. for 20 minutes. The resulting film was smooth and in excellent appearance. The electrodeposition data and the properties of the resulting film are shown in Table 1. In the above example, the ratio $(B/P_1 + P_2)$ of the amount of (B) of the binder resin to the sum $(P_1 + P_2)$ of the amount $(P_1)$ of the non-ionic resin powder and the amount $(P_2)$ of the pigment was 100/600.

EXAMPLE 2

40 parts of isopropanol, 20 parts of dimethylaminoethyl methacrylate, 15 parts of 2-hydroxyethyl methacrylate, 25 parts of styrene, 40 parts of butyl acrylate, 2 parts of tertiary dodecylmercaptan and 2 parts of azobisosbutyronitrile were mixed and agitated together and were made to react under reflux in an inert gas current for 2 hours. Then 0.5 part of azobisisobutyronitrile was added thereto and further the mixture was made to react under reflux for 4 hours to obtain an aminoacryl resin (cationic binder resin). Apart from the above, 100 parts of acrylic resin powder C-45-2 (trade name of Mitubishi Rayon Co., Ltd.), 40 parts of titanium oxide and 1 part of Mikileveling (leveling agent, trade name of Kyoeisha Oil & Fat Co., Ltd.) were mixed together and the mixture was kneaded and pulverized in the same manner as in Example 1. 3.7 parts of glacial acetic acid and 500 parts of deionized water were added to 141 parts of the above prepared binder resin and the mixture was well agitated in a dissolver. Then 604 parts of the above prepared powder were added thereto to prepare an electrodeposition bath and the electrodeposition was conducted in the same manner as in Example 1. The electrodeposition data and the film properties are shown in Table 1.

Control 1

40 parts of titanium oxide powder were dispersed in an ordinary manner (of producing an ordinary paint for electrodeposition) in 125 parts of a maleated oil which is an ordinary anionic binder resin obtained by adding 100 parts of maleic anhydride to 400 parts of linseed oil, diluting the same with 80 parts of diacetone alcohol and neutralizing with 45 parts of triethylamine. By using this anionic paint composition, anionic electrodeposition was conducted. The data and film properties are shown in Table 1.

Control 2

The procedure of the above Control 1 was repeated except that 634 parts of the powder prepared and used in Example 1 were used instead of the titanium oxide. The resulting film was rough in the surface and had no uniform smoothness. The results are shown in Table 1.

EXAMPLE 3

A mixture of 40 parts of isopropanol and 1 part of azobisisobutyronitrile was heated to the reflux temperature. Then a liquid mixture of 30 parts of glycidyl methacrylate, 30 parts of styrene, 40 parts of 2-ethylhexyl acrylate and 2 parts of azobisisobutyronitrile was dropped thereto under reflux over 2 hours. Further the mixture was made to react for 3 hours, and then 10 parts of diethylamine and 6 parts of isopropanol were added thereto to react under reflux for 3 hours to obtain an acryl modified aminoepoxy resin (cationic binder resin). Then 3.5 parts of glacial acetic acid and 200 parts of deionized water were added to 133 parts of the above mentioned binder resin and the mixture was well mixed and dissolved in a dissolver. Then 444 parts of the powder prepared and used in Example 1 were added thereto to prepare an electrodeposition bath. The electrodeposition was conducted with such bath in the same manner as in Example 1. The electrodeposition data and properties of the resulting film are shown in Table 2.

EXAMPLE 4

A mixture of 245 parts of Cardula E (trade name of Shell Oil Co.), 31 parts of monoethanolamine and 69 parts of isopropanol was heated and agitated and was made to react at the reflux temperature for 5 hours to prepare an aminoepoxy resin (cationic binder resin). Then 12 parts of glacial acetic acid and 200 parts of deionized water were added to 125 parts of this binder resin, and the mixture was well mixed and dissolved in a dissolver. Then 444 parts of the powder prepared and used in Example 1 were added thereto to prepare an aqueous bath. Electrodeposition was conducted in thin bath in the same manner as in Example 1. The electrodeposition data and film properties are shown in Table 2.

EXAMPLE 5

The aminoacryl resin in Example 2 was used as a binder resin and a kneaded mixture of the epoxy resin powder in Example 1 and titanium oxide was used as a powder. 3.7 parts of glacial acetic acid and 200 parts of deionized water were added to 141 parts of the binder resin and the mixture was dissolved. Then 106 parts of the powder were added to the solution to prepare an electrodeposition bath. In this bath, electrodeposition was conducted in the same manner as in Example 1. The electrodeposition data and film properties are shown in Table 2.

EXAMPLE 6

A mixture of 225 parts of diethylenetriamine and 330 parts of isophthalic acid was heated and agitated and was made to react at 190° to 200°C. for 1 hour and 30 minutes. The product was dehydrated by 71 parts under a reduced pressure and was cooled to 140°C. Then 50 parts of isopropanol and 158 parts of deionized water were added thereto, and further 210 parts of epichlorohydrin were dropped into the mixture at 50°C. over 10 minutes and the mixture was made to react at 60° to 70°C. for 1 hour to obtain a polyamide resin (cationic binder resin). Apart from the above, 100 parts of melamine-containing polyester resin powder SCADONAL P-2001 (trade name of Scado Co.), 1 part of Modaflow (leveling agent, trade name of Monsanto Co.), 2 parts of Mikileveling and 50 parts of titanium oxide were treated in the same manner as in Example 1 to prepare a powder preparation. Then 800 parts of deionized water and 3.6 % aqueous solution of hydrochloric acid were added to 130 parts of the above mentioned binder resin to adjust the pH to 4.0. Then 2040 parts of the above prepared powder were added thereto to prepare an electrodeposition bath. Electrodeposition was conducted in the same manner as in Example 1. The electrodeposition data and film properties are shown in Table 2.

EXAMPLE 7

A mixture of 250 parts of isopropanol, 84 parts of diethanolamine and 21 parts of Mikileveling was agitated and was heated to 60°C. Then 500 parts of Araldite 7072 (trade name of Ciba, Ltd.) were added thereto and the mixture was made to react at a reflux temperature for 1 hour and 30 minutes. Then 60 parts of Sumimal M60 (melamine resin, trade name of Sumitomo Chemical Co., Ltd.) were gradually added thereto and the mixture was further made to react at a reflux temperature for 1 hour to obtain an aminoepoxy resin (binder resin). Apart from this, 500 parts of epoxy powdery resin Araldite 6084, 20 parts of carbon black and 20 parts of dicyandiamide were mixed together, kneaded and pulverized by a dry blending process with a steel ball mill for 40 hours to prepare a powder preparation. 7.4 parts of propionic acid and 500 parts of deionized water were added to 140 parts of the above prepared binder resin and then 1080 parts of the above prepared powder preparation to prepare an aqueous bath. With this bath, electrodeposition was conducted in the same manner as in Example 1. The electrodeposition data and properties of the resulting film are shown in Table 2.

Table 1

|  |  | Example 1 | Example 2 | Control 1 | Control 2 |
|---|---|---|---|---|---|
| Electrodeposition data | Solid ratio ($B/P_1 + P_2$) | 100/600 | 100/600 | 100/40 | 100/600 |
|  | Electrodepositing conditions: Time | 10 seconds | 10 seconds | 3 minutes | 10 seconds |
|  | Voltage and liquid temp. | 200 V. at 30°C. | 300 V. at 30°C. | 200 V. at 30°C. | 200 V. at 30°C. |
|  | Coulomb efficiency (mg./c.) | 103 | 96 | 12 | 93 |
|  | Film thickness (microns) | 85 | 80 | 25 | About 80 |
| Film properties | Appearance | Good | Good | Good | Not good (rough) |
|  | Pencil hardness | 2H | 2H | B | H |
|  | Waterproofness | Not less than 500 hrs. | Not less than 500 hrs. | Not more than 240 hrs. | Impossible to test |
|  | Anticorrosion | Not less than 500 hrs. | Not less than 500 hrs. | Not more than 96 hrs. | do. |
|  | Alkaliproofness | Not less than 500 hrs. | Not less than 500 hrs. | Not more than 30 min. | do. |
|  | Xyleneproofness | Not less than 200 hrs. | Not less than 200 hrs. | Not more than 5 hrs. | do. |
|  | Baking conditions: Temperature and time | 190°C. for 20 minutes | 190°C. for 20 minutes | 170°C. for 30 minutes | 190°C. for 20 minutes |

Table 2

|  |  | Example 3 | Example 4 | Example 5 | Example 6 | Example 7 |
|---|---|---|---|---|---|---|
| Electrodeposition data | Solid ratio ($B/P_1 + P_2$) | 100/420 | 100/420 | 100/100 | 100/2000 | 100/1040 |
|  | Electrodepositing conditions: Time | 15 seconds | 15 seconds | 30 seconds | 10 seconds | 3 seconds |
|  | Voltage and liquid temp. | 250 V. at 30°C. | 200 V. at 30°C. | 200 V. at 30°C. | 100 V. at 30°C. | 300 V. at 30°C. |
|  | Coulomb efficiency (mg./c.) | 65 | 62 | 38 | 112 | 122 |
|  | Film thickness (microns) | 78 | 70 | 55 | 83 | 97 |
| Film properties | Coating film appearance | Good | Good | Good | Good | Good |
|  | Pencil hardness | H | H | H | H | H |
|  | Waterproofness | Not less than 500 hrs. | Not less than 500 hrs. | Not less than 500 hrs. | Not less than 500 hrs. | Not less than 500 hrs. |
|  | Anticorrosion | Not less than 500 hrs. | Not less than 500 hrs. | Not less than 240 hrs. | Not less than 500 hrs. | Not less than 500 hrs. |
|  | Alkaliproofness | Not less than 500 hrs. | Not less than 500 hrs. | Not less than 120 hrs. | Not less than 96 hrs. | Not less than 500 hrs. |
|  | Xyleneproofness | Not less than 200 hrs. | Not less than 200 hrs. | Not less than 120 hrs. | Not less than 120 hrs. | Not less than 200 hrs. |
|  | Baking conditions: Temperature and time | 180°C. for 30 minutes | 180°C. for 30 minutes | 180°C. for 30 minutes | 180°C. for 30 minutes | 180°C. for 30 minutes |

EXAMPLE 8

400 parts of urethane modified epoxy resin EPU-X-4-2 (trade name of Asahi Denka Co. Ltd.), 28 parts of diethanolamine and 200 parts of isopropyl alcohol were made to react under reflux at a temperature from 80°C. to 85°C. for 1 hour. Then 8 parts of Mikileveling and 20 parts of isopropyl alcohol were added thereto and further the mixture was made to react under reflux for 2 hours to obtain an urethane modified aminoepoxy resin (cationic resin). Apart from this, 350 parts of Epikote 1004, 150 parts of Epikote 1007 and 40 parts of Nylon resin F-30 (trade name of Teikoku Chemical Ind. Ltd.) were mixed, melted, kneaded and roughly crushed in the same manner as Example 1, and then finely ball-milled together with 50 parts of black iron oxide pigment and 20 parts of dicyandiamide to obtain a powder preparation having an average particle diameter of 40 microns to 50 microns. Then, 1 part of glacial acetic acid and 500 parts of deionized water were added to 62 parts of the above mentioned binder resin and the mixture was well agitated with a dissolver. Then 200 parts of the above prepared powder were added thereto and the mixture was mixed and dispersed in the same way as Example 1, and then diluted with deionized water to a solid content of 15 %. At this time a small amount of glacial acetic acid was also added in order to adjust pH of the bath to about 5. With this bath an electrodeposition was conducted in the same way as in Example 1. The resulting baked film was flat, smooth and glossy, and film properties were similar to those in Example 1.

EXAMPLE 9

Urethane modified aminoepoxy resin prepared in Example 8 was used as a cationic binder resin. 50 parts of Epikote 1004 were dissolved in 300 parts of acetone, and 200 parts of fine powder polyethylene resin UF-1.5 (trade name of Seitetsu Kagaku Co., Ltd.) were added thereto and the mixture was agitated to form a homogeneous liquid, which was heated to about 60°C. for about 20 minutes in order to evaporate acetone completely and was cooled. The concentrate was finely grinded by ballmill into 40 microns to 50 microns in an average particle size, to prepare a powder preparation. Then 1 part of glacial acetic acid and 300 parts of deionized water were added to 60 parts of said binder resin, the mixture was well agitated, and then 200 parts of the above prepared powder were added thereto to prepare an aqueous bath. With this bath an electrodeposition was conducted in the same manner as in Example 1. The electrodeposited film was baked at a temperature slightly higher than the melting point of said polyethylene resin. The dry film had two uniform layers which consisted of a thin binder layer as a underlayer adhered to the surface of the cathodic article and a thick powder resin layer as an upper layer with an excellent appearance.

EXAMPLE 10

The procedure of Example 9 was repeated except that polypropylene resin W-11 (trade name of Sumitomo Chemical Co., Ltd.) was used instead of polyethylene resin UF-1.5 in Example 9. The resulting film was similar to that obtained in Example 9.

What we claim is:

1. A method of electrocoating which comprises immersing an electrically conductive metallic article as a cathode in an aqueous electrodeposition bath containing a cationic binder resin and a non-ionic synthetic resin powder dispersed therein, the amount of the latter being 100 – 5000 parts by weight per 100 parts of the former, applying a voltage between said cathodic article and an anode to cause electric current flow through said bath so that a resinous coating comprising said binder resin and non-ionic resin powder is electrodeposited on the cathodic article, taking the coated article out of the bath and baking the same to form an adherent resinous film on said article.

2. A method as claimed in claim 1 wherein the bath further contains up to 30 parts by weight per 100 parts of the total resinous material in the bath of pigment powder dispersed therein.

3. A method as claimed in claim 1 wherein the amount of the non-ionic synthetic resin powder is 100 – 1000 parts by weight per 100 parts of the cationic binder resin.

4. A method as claimed in claim 1 wherein the cationic binder resin is water-thinnable or water-soluble and prepared by the at least partial neutralization of a basic resin containing nitrogen atoms in the molecule with an acid compound or a compound which is capable of producing an acid compound when reacted with the basic nitrogens in said basic resin.

5. A method as claimed in claim 4, in which said basic resin having nitrogen atoms in the molecule is selected from the group consisting of aminoepoxy resins, urethane modified aminoepoxy resins, aminoacrylic resins, aminovinyl resins and polyamide resins.

6. A method as claimed in claim 4, in which said acid compound in selected from the group consisting of inorganic acids and organic acids, preferably hydrochloric acid, phosphoric acid, formic acid, acetic acid, propionic acid, citric acid, malic acid, tartaric acid and arylic acid.

7. A method as claimed in claim 4, in which the quantity of said acid compound to be used for the neutralization of the basic resin is from 0.2 to 3.0 equivalents, preferably 0.5 to 1.5 equivalents per one equivalent of the amino groups or basic nitrogens in said basic resin.

8. A method as claimed in claim 4, in which the compound which is capable of producing an acid compound when reacted with the amino groups or basic nitrogens in said basic resin is selected from epihalohydrins, and the quantity of the same is from 0.5 to 2.0 equivalents per one equivalent of the amino groups or basic nitrogens in said basic resin.

9. A method as claimed in claim 1 wherein the non-ionic synthetic resin powder is one which is solid at the room temperature or can melt in the baking step and has an average particle size from 0.5 to 100 microns.

10. A method as claimed in claim 1 wherein the non-ionic synthetic resin is selected from the group consisting of epoxy resins, polyester resins, acrylic resins, polyurethane resins, polyamide resins, polyolefin resins and cellulose derivative resins.

11. A method as claimed in claim 1 wherein the solid content of the bath is 5 – 30 %, preferably 10 – 20 %.

12. A method as claimed in claim 1 wherein the voltage to be applied is 20 – 600 V., preferably 50 – 400 V., and the electrodeposition is conducted at a bath pH of 7 or lower, preferably 4 – 6.

13. A method as claimed in claim 1 wherein the bath further contains an organic solvent which is a solvent for the binder resin but is substantially non-solvent for the non-ionic resin powder.

* * * * *